Aug. 29, 1972 S. A. CICHOSKI ETAL 3,687,778
APPARATUS FOR THE WIPING TRANSFER OF BONDING
AGENT ONTO A LONGITUDINAL MEMBER AND AN
UNDERLAPPING MARGIN OF A TAPE ON
THE LONGITUDINAL MEMBER
Filed Feb. 26, 1970  7 Sheets-Sheet 1

INVENTORS.
SYLVESTER A. CICHOSKI,
PAUL H. DAMON,
RONALD J. GOLEMBESKI &
WILLIAM P. LAWLER

By
Attorney

Aug. 29, 1972     S. A. CICHOSKI ETAL     3,687,778
APPARATUS FOR THE WIPING TRANSFER OF BONDING
AGENT ONTO A LONGITUDINAL MEMBER AND AN
UNDERLAPPING MARGIN OF A TAPE ON
THE LONGITUDINAL MEMBER
Filed Feb. 26, 1970     7 Sheets-Sheet 2

INVENTORS.
SYLVESTER A. CICHOSKI,
PAUL H. DAMON,
RONALD J. GOLEMBESKI &
WILLIAM P. LAWLER
By
Attorney

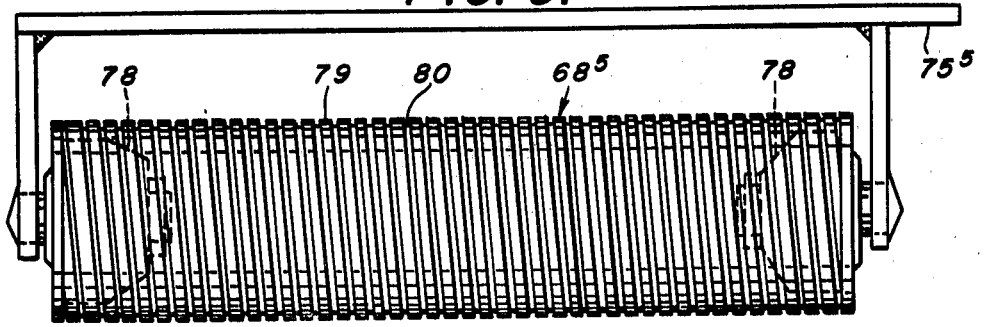
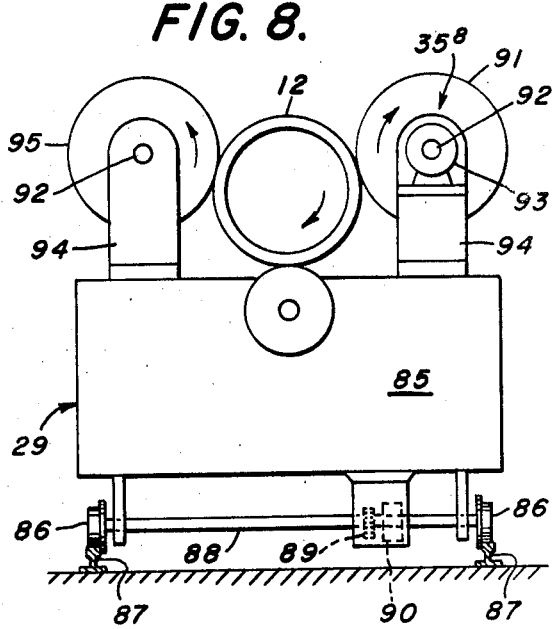
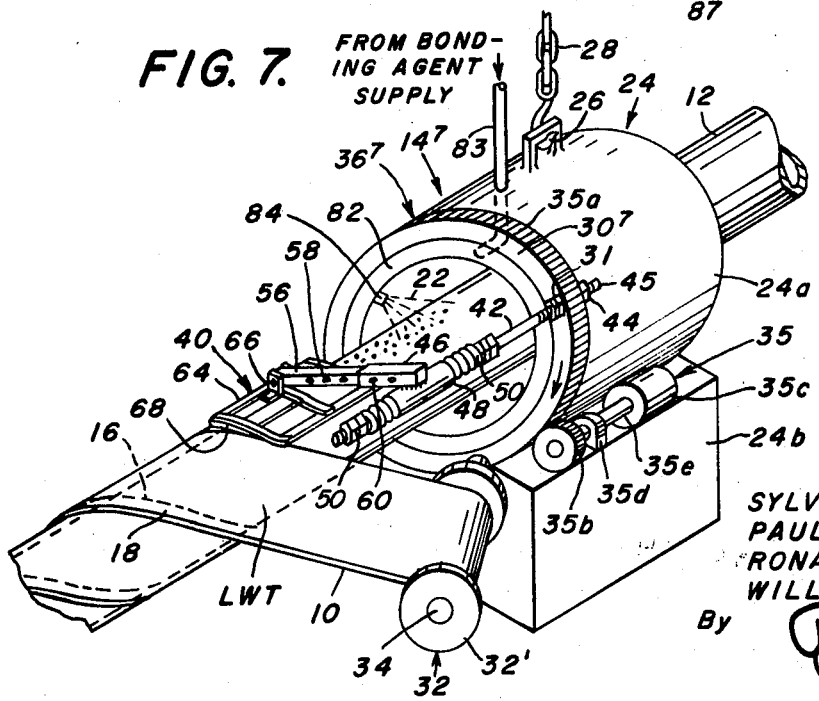

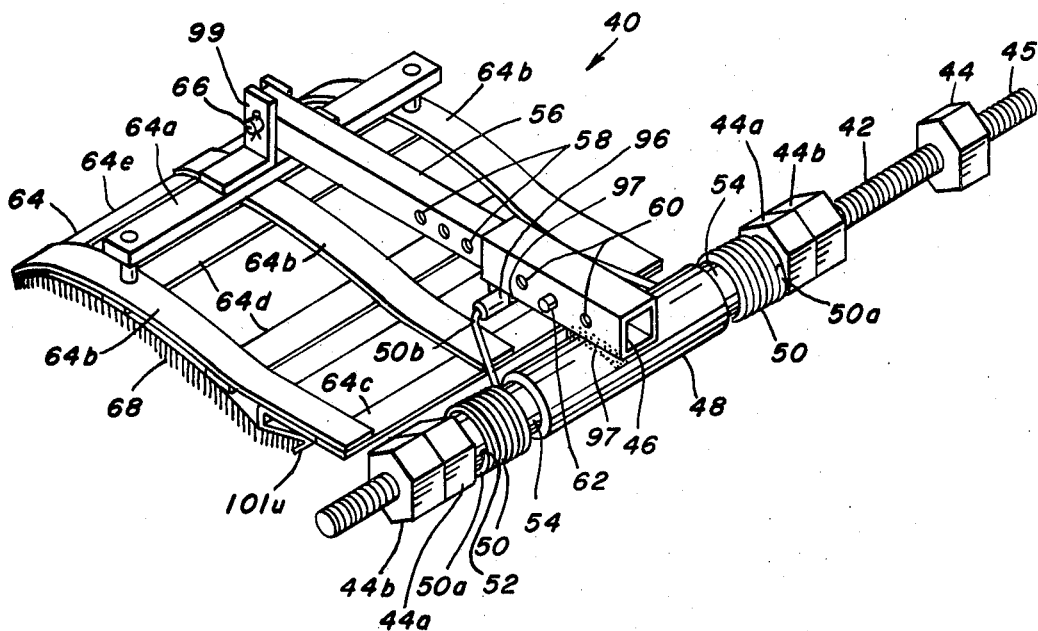

Aug. 29, 1972   S. A. CICHOSKI ETAL   3,687,778
APPARATUS FOR THE WIPING TRANSFER OF BONDING
AGENT ONTO A LONGITUDINAL MEMBER AND AN
UNDERLAPPING MARGIN OF A TAPE ON
THE LONGITUDINAL MEMBER
Filed Feb. 26, 1970   7 Sheets-Sheet 5

INVENTORS.
SYLVESTER A. CICHOSKI,
PAUL H. DAMON,
RONALD J. GOLEMBESKI &
WILLIAM P. LAWLER

By

Attorney

INVENTORS.
SYLVESTER A. CICHOSKI, PAUL H. DAMON,
RONALD J. GOLEMBESKI & WILLIAM P. LAWLER
By
Attorney INVENTORS.
SYLVESTER A. CICHOSKI,
PAUL H. DAMON,
RONALD J. GOLEMBESKI &
WILLIAM P. LAWLER
By
Attorney United States Patent Office 3,687,778
Patented Aug. 29, 1972

3,687,778
APPARATUS FOR THE WIPING TRANSFER BOND-
ING AGENT ONTO A LONGITUDINAL MEMBER
AND AN UNDERLAPPING MARGIN OF A TAPE
ON THE LONGITUDNIAL MEMBER
Sylvester A. Cichoski, Crescent Township, Allegheny County, Paul H. Damon, Monroeville, Ronald J. Golembeski, Moon Township, Allegheny County, and William P. Lawler, Mount Lebanon Township, Allegheny County, Pa., assignors to United States Steel Corporation
Filed Feb. 26, 1970, Ser. No. 14,284
Int. Cl. B29c 81/00
U.S. Cl. 156—392
36 Claims

ABSTRACT OF THE DISCLOSURE

An apparatus for the wiping transfer of a bonding agent onto a longitudinal member and onto the underlapping portions of a protective tape wrapped onto the longitudinal member is disclosed. The tape has an underlapping margin and an overlapping margin during the wrapping operation. The underlapping margin defines with the longitudinal member a transitional cavity. The tape is wrapped on the longitudinal member with a bonding agent therebetween. The overlapping margin is wrapped onto the underlapping margin with the bonding agent between and the transitional cavity is substantially filled with the bonding agent and is then covered by the overlapping margin. The tape has a last wrapped turn on the longitudinal member during the wrapping operation.

The apparatus has a housing disposed about the longitudinal member, and a longitudinal drive means connected to one member of the longitudinal member and the housing for causing relative longitudinal movement between the longitudinal member and the housing along a path of wrapping movement. Wrapping means are provided on the housing for storing the tape and for feeding the tape to the longitudinal member. Rotary drive means are connected to one means of the wrapping means and the longitudinal member for causing relative rotary movement therebetween and for wrapping the tape about the longitudinal member. Bonding agent supply means are adjacent the housing and the longitudinal member for feeding the bonding agent to the longitudinal member ahead of the last wrapped turn of the tape on the longitudinal member. Bonding agent wiping means are adjacent the housing for picking up the bonding agent on the longitudinal member, for transferring the bonding agent on the longitudinal member around the longitudinal member adjacent the last wrapped turn of the tape on the longitudinal member preparatory for the application of the next wrapped turn of the tape, for transferring the bonding agent on the longitudinal member onto the underlapping margin preparatory for the wrapping of the overlapping margin of the next wrapped turn of the tape thereon, and for substantially filling the transitional cavity with the bonding agent.

The above described apparatus may also have a shuttle rotatable on the housing and the bonding agent wiping means may have a mounting member secured to one of the housing and the shuttle. A horizontal mounting means is pivotable on one end thereof of the mounting member. A wiper member frame is pivotable on the other end of the horizontal mounting means and a wiper member is carried by the wiper member frame.

Alternatively, the above described apparatus has a shuttle rotatable on the housing and the bonding agent wiping means has a mounting member secured to one of the housing and the shuttle. A horizontal mounting means is pivotable on one end thereof of the mounting member. A vertical mounting means is carried by the other end of the horizontal mounting means. A wiper member frame is pivotable on the vertical mounting means and a wiper member is carried by the wiper member frame.

BACKGROUND OF THE INVENTION

Heretofore, conventional methods of and apparatus for applying a bonding agent, tape and the like, to the longitudinal member have been of the type shown in the following U.S. patents.

We are aware of the following prior art:

| U.S. Patent No. | Inventor | Issued |
|---|---|---|
| 1,299,037 | Reynolds | 4/1/19 |
| 1,319,455 | Barlett | 10/21/19 |
| 1,821,352 | McManis | 9/1/31 |
| 1,985,979 | Keeran | 1/1/35 |
| 1,988,628 | McDonald et al | 1/22/35 |
| 2,291,823 | Mickelsen et al | 8/4/42 |
| 2,371,224 | Cumfer | 3/13/45 |
| 2,377,608 | Bronson | 6/5/45 |
| 2,405,909 | Smith et al | 8/13/46 |
| 2,716,315 | Jacoby | 8/30/55 |
| 2,877,150 | Wilson | 3/10/59 |
| 2,900,881 | Barnes et al | 8/25/59 |
| 2,944,586 | Yanulis | 7/12/60 |
| 2,948,200 | Westerbarkey | 8/9/60 |
| 3,018,212 | Chinn | 1/23/62 |
| 3,099,190 | Allen et al | 7/30/63 |
| 3,163,182 | Sandow | 12/29/64 |
| 3,170,489 | Cunningham | 2/23/65 |
| 3,194,275 | Biggs et al | 7/13/65 |
| 3,230,123 | Christensen | 1/18/66 |
| 3,234,970 | Baker et al | 2/15/66 |
| 3,247,869 | Boegershausen et al | 4/26/66 |
| 3,315,864 | Martin et al | 4/25/67 |
| 3,338,270 | Renenberg | 8/29/67 |
| 3,379,171 | Cordingly et al | 4/23/68 |
| 3,389,009 | McNulty et al | 6/18/68 |
| 3,402,742 | O'Brien | 9/24/68 |
| 3,404,050 | Gill | 10/1/68 |

In the wrapping of fluid pipe lines with a protective tape conventional primer rugs or sleeves are employed. These primer rugs wipe the primer around the pipe after such primer has been dripped onto the top of the pipe. Alternatively, extrusion type boot sleeves are employed which extrusion type foot sleeves extrude primer around the pipe through the extrusion end of the extrusion type boot sleeves. Such conventional devices fail to give complete pipe line protection since the spirally wound tape leaves the overlapped margin unfilled and therefore produces a discontinuous envelope about the pipe.

OBJECTS OF THE INVENTION

It is the general object of this invention to avoid and overcome the foregoing and other difficulties of and objections to prior art practices by the provision of a novel apparatus for the wiping transfer of a bonding agent onto a longitudinal member and onto the underlapping portions of a protective tape being wrapped onto the longitudinal member. The improved apparatus:

(a) utilizes direct contact between the wiping applicator and the surface of the longitudinal member where the coating is picked up and the surface to which it is transferred to and redeposited;

(b) provides a sealed overlapping margin and effect a continuous wrapped envelope about the longitudinal member;

(c) completely seals the transitional area (defined by the underlapping margin and the longitudinal member) with the bonding agent and cover such filled transitional cavity with the overlapping margin of the tape;

(d) is universally adapted to use a wide range of bonding agent materials including those with abnormally low or high viscosities; and (e) seals the underlapping margin and overlapping margin with an internal source of bonding agent deposited on the longitudinal member ahead of the last wrapped turn of the tape on the longitudinal member.

BRIEF SUMMARY OF THE INVENTION

The aforesaid objects of this invention and other objects which will become apparent as the description proceeds are achieved by providing an improved apparatus for the wiping transfer of a bonding agent onto a longitudinal member and onto the underlapping portions of a protective tape being wrapped onto the longitudinal member. The tape has an underlapping margin and an overlapping margin during the wrapping operation. The underlapping margin defines with the longitudinal member a transitional cavity. The tape is wrapped on the longitudinal member with a bonding agent therebetween. The overlapping margin is wrapped onto the underlapping margin with the bonding agent between and the transitional cavity is substantially filled with the bonding agent and is then covered by the overlapping margin. The tape has a last wrapped turn on the longitudinal member during the wrapping operation.

The apparatus has a housing disposed about the longitudinal member, and a longitudinal drive means connected to one member of the longitudinal member and the housing for causing relative longitudinal movement between the longitudinal member and the housing along a path of wrapping movement. Wrapping means are provided on the housing for storing the tape and for feeding the tape to the longitudinal member. Rotary drive means are connected to one means of the wrapping means and the longitudinal member for causing relative rotary movement therebetween and for wrapping the tape about the longitudinal member. Bonding agent supply means are adjacent the housing and the longitudinal member for feeding the bonding agent to the longitudinal member ahead of the last wrapped turn of the tape on the longitudinal member. Bonding agent wiping means are on the housing for picking up the bonding agent on the longitudinal member, for transferring the bonding agent onto the longitudinal member around the longitudinal member adjacent the last wrapped turn of the tape on the longitudinal member preparatory for the application of the next wrapped turn of the tape, for transferring the bonding agent from the longitudinal member onto the underlapping margin preparatory for the wrapping of the overlapping margin of the next wrapped turn of the tape thereon, and for substantially filling the transitional cavity with the bonding agent.

The above described apparatus may also have a shuttle rotatable on the housing and the bonding agent wiping means may have a mounting member secured to one of the housing and the shuttle. A horizonal mounting means is pivotable on one end of the mounting member. A wiper member frame is pivotable on the other end of the horizontal mounting means and a wiper member is carried by the wiper member frame.

Alternatively, the above described apparatus has a shuttle rotatable on the housing and the bonding agent wiping means has a mounting member secured to one of the housing and the shuttle. A horizontal mounting means is pivotable on one end of the mounting member. A vertical mounting means is carried by the other end of the horizontal mounting means. A wiper member frame is pivotable on the vertical mounting means and a wiper member is carried by the wiper member frame.

BRIEF DESCRIPTION OF THE SEVERAL VIEWS OF THE DRAWINGS

For a better understanding of this invention, reference should be had to the accompanying drawings wherein like numerals of reference indicate similar parts throughout the several views and wherein:

FIG. 5 is a fragmentary side elevational view of an alternative embodiment of a wiper member and showing a rotary-type wiping member having a square wire provided with a chamfer slot and wound around the periphery of the pivotable roller;

FIG. 6 is a fragmentary perspective view similar to the upper portion of FIG. 1 and showing an alternative embodiment of the bonding agent supply means utilizing a spray type feed of the bonding agent from a pressurized bonding agent spray;

FIG. 7 is a perspective view similar to FIGS. 1 and 6 and showing another embodiment of the bonding agent supply means utilizing centrifugal type feed and including a stationary circular storage tank for the bonding agent and a rotating shuttle rotatable within the stationary circular storage tank, such shuttle having an outlet for centrifugally depositing the bonding agent around the pipe;

FIG. 8 is an end elevational view of an alternative embodiment of the longitudinal drive means and the rotary drive means and showing the longitudinal member or pipe supported on a movable carriage reciprocable on tracks and further showing the longitudinal member or pipe rotatable by a drive roller and a driven roller;

FIG. 9 is an enlarged perspective view of the bonding agent wiping means shown in FIGS. 1, 7;

Although the principles of this invention are broadly applicable to the application of a liquid to a longitudinal member adjacent the last wrapped turn of a tape on the longitudinal member and onto the underlapping margin of such last wrapped turn, this invention is particularly adapted for use in connection with the application of a bonding agent to the portion of the longitudinal member adjacent the last wrapped turn of a protective tape on the longitudinal member and onto the underlapping margin of such last wrapped turn of protective tape and hence it has been so illustrated and will be so described.

DETAILED DESCRIPTION

Figure 1:
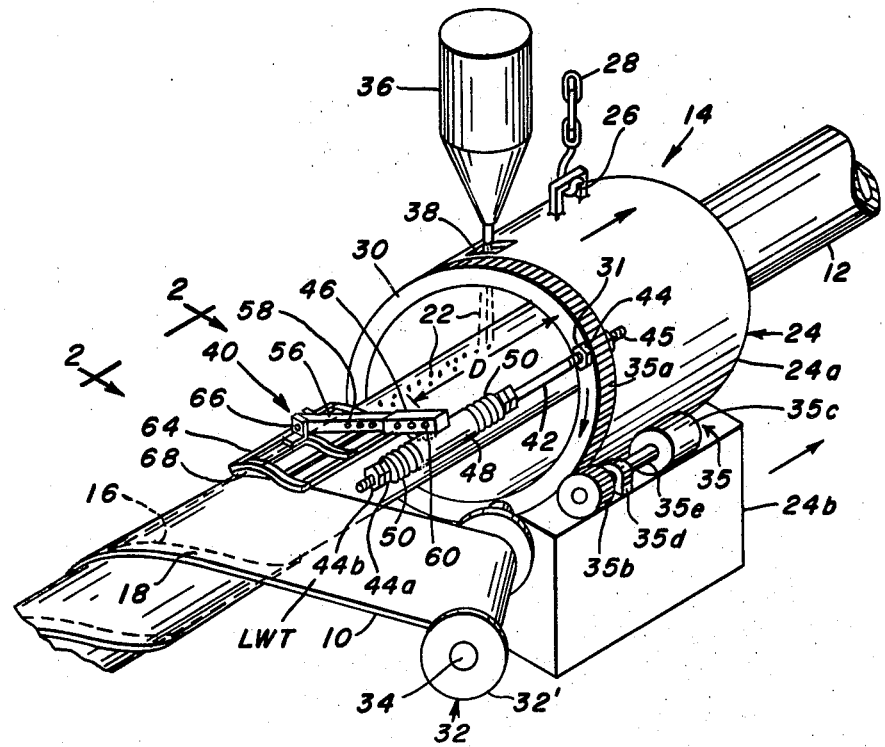
FIG. 1 is a perspective view of a preferred embodiment of the apparatus for spirally wrapping the protective tape in overlapping engagement on a longitudinal member, such as a pipe or the like, and showing a non-rotatable housing, a rotatable shuttle mounted on the housing, a pipe wrapping means secured to the shuttle and one embodiment of a wiping transfer device secured to the rotatable shuttle.

With specific reference to the form of this invention illustrated in the drawings and referring particularly to FIG. 1, an apparatus for wrapping a protective tape 10 (FIGS. 1, 2, 2A, 7, 10) in overlapping spiral engagement on a longitudinal member, such as a hollow pipe 12 (FIGS. 1, 2, 2A, 6, 7, 8, 10, 13) or the like, is indicated generally by the reference numeral 14 (FIG. 1).

The protective tape 10 may be, for example, a laminate composed of an inner coal tar rubber based sheet laminated to an outer polyvinyl chloride (PVC) sheet.

The protective tape 10 may also be any of the following blends, laminates or other material:

Blends (1) Polyvinyl chloride and coal tar;
(2) Polyethylene and asphalt;
(3) Polyvinyl chloride and butyl rubber;
(4) Copolymers of vinylchloride and vinylacetate and coal tar pitch; or
(5) Ethylene vinylacetate copolymer and coal tar.

Laminates (1) Polyvinyl chloride backed coal tar rubber blend;
(2) Polyethylene backed coal tar rubber blend; or
(3) Polypropylene backed coal tar rubber blend.

Other material (1) Polyethylene;
(2) Polypropylene; or
(3) Coal tar rubber blends reinforced or laminated with glass, nylon, or felt.

Figure 2:
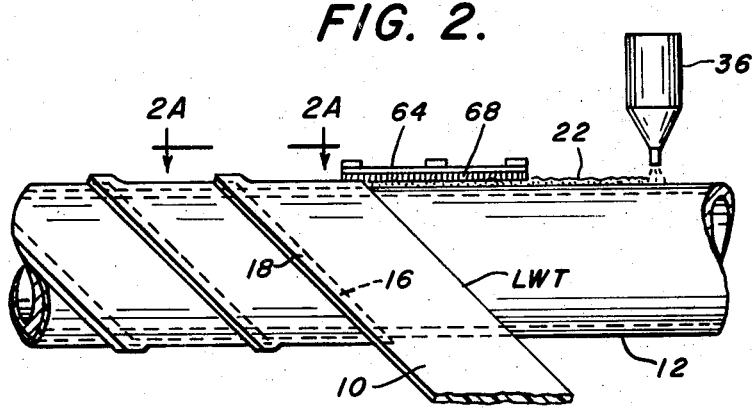
FIG. 2 is a fragmentary enlarged side elevational view taken along the line 2—2 of FIG. 1 in the direction of the arrows and having the wiper member support structure, the shuttle and the housing removed for clarity.
Figure 2A:
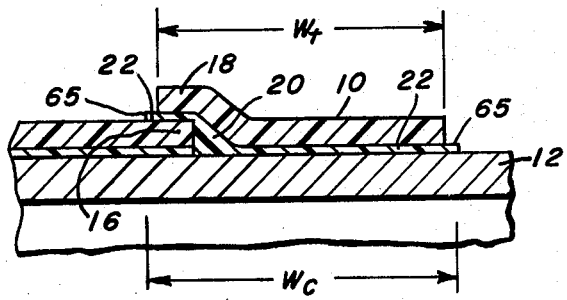
FIG. 2A is a fragmentary enlarged side elevational view taken along the line 2A—2A of FIG. 2 in the direction of the arrows and showing the underlapping margin, the overlapping margin, the transitional cavity, the bonding agent and the pipe.

The tape 10 has during the wrapping operation an underlapping margin 16 (FIGS. 1, 2, 2A, 7, 10) and an overlapping margin 18 (FIGS. 1, 2, 2A, 7, 10). The underlapping margin 16 defines with the pipe 12 a transitional cavity 20 (FIG. 2A). The tape 10 is wrapped on the pipe 12 with a bonding agent 22 (FIGS. 1, 2, 2A, 6, 7, 10) therebetween.

The bonding agent 22 may be either an adhesive, a primer, sealant, coating or the like, for example, a primer of the type known as "Quick Dry." "Quick Dry" is a trade name of the assignee of the present invention for a primer of the type disclosed in U.S. Pat. No. 2,752,267, issued June 26, 1956, to Norman T. Shideler. Other bonding agents 22 may be:

(1) butyl rubber in a solvent;
(2) vinyl copolymers blended coal tar pitch in a solvent;
(3) epoxy primers;
(4) bitumin, petroleum wax or the like; and
(5) chlorinated rubber and creosote oil.

The overlapping margin 18 is wrapped on the underlapping margin 16 with the bonding agent 22 therebetween and the transitional cavity 20 (FIG. 2A) is substantially filled with the bonding agent 22 and covered by the overlapping margin 18 during the wrapping operation.

The tape 10 has a last wrapped turn LWT (FIGS. 1, 2, 7, 10) on the pipe 12 during such wrapping operation.

APPARATUS 14

Figure 10:
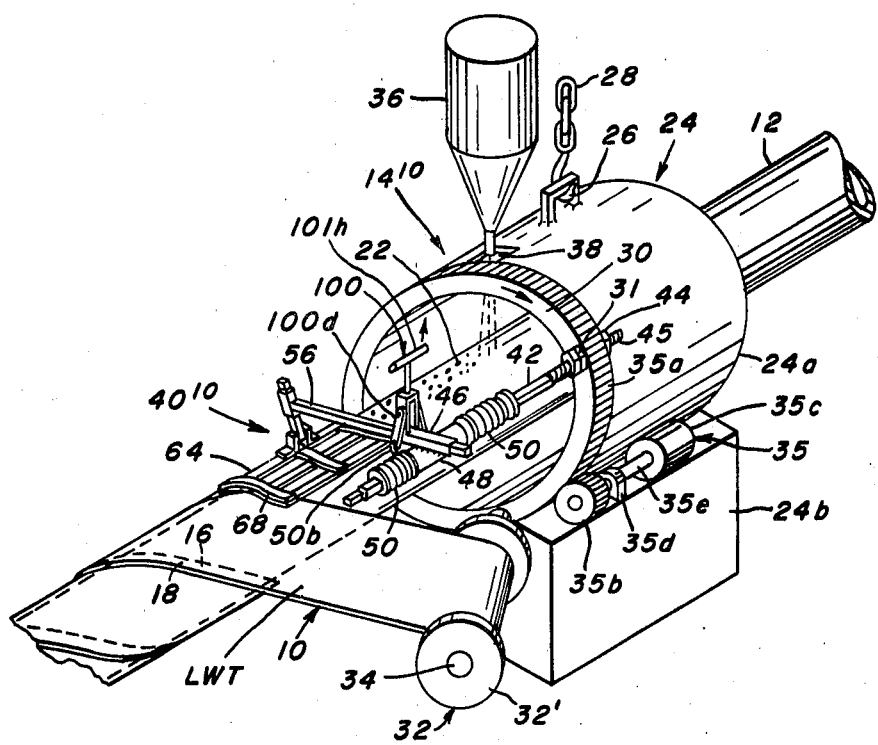
FIG. 10 is a perspective view of an alternative embodiment of the apparatus and showing a tensioning means connected to the biasing means on the bonding agent wiping means, which tensioning means is utilized for controlling the biasing of the bonding agent wiping means against the longitudinal member and is shown in the loaded or tensioning position.

The apparatus 14 has a housing 24 (FIGS. 1, 6, 7, 10) disposed about the pipe 12. The housing 24 has an upper hollow generally cylindrical portion 24a (FIGS. 1, 6, 7, 10) which is disposed around the pipe 12 and is connected to a bottom or base portion 24b (FIGS. 1, 7, 10). The apparatus 14, in the embodiment of FIG. 1, is supported by means of a hook 26 (FIGS. 1, 7, 10) extending from the cylindrical portion 24a and, for example, a chain 28 (FIGS. 1, 7, 10) from a boom (not shown) of a supporting or a slave side boom type tractor or the like (not shown). A longitudinal drive means (not shown) may be of the type utilized in the U.S. Pat. No. 2,583,819, issued Jan. 29, 1952, to J. D. Cummings. This longitudinal drive means (not shown) is connected to one member of the pipe 12 and the housing 24 for causing relative longitudinal movement between the pipe 12 and the housing 24 along a path of wrapping movement indicated by the arrow in FIG. 1. In this case (FIG. 1), the longitudinal drive means (not shown) is carried by the housing 24 and in driving contact with the pipe 12.

Disposed on the left-hand end, as viewed in FIG. 1, of the housing 24 is a rotatable shuttle 30 (FIGS. 1, 3A, 6, 10). Wrapping means 32 (FIGS. 1, 7, 10) has a supply reel $32^1$ (FIGS. 1, 7, 10) or the like, is mounted on a tape arm 34 (FIGS. 1, 7, 10) on the rotatable shuttle 30 and is employed for storing the tape 10 and for feeding the tape 10 to the pipe 12. Rotary drive means 35 (FIGS. 1, 7, 10) may be of the type disclosed in such U.S. Pat. No. 2,583,819, or, as shown in FIGS. 1, 7, 10, have gear teeth 35a (FIGS. 1, 7, 10) on the rotatable shuttle 30 engage a drive gear 35b driven by a motor 35c mounted on the base 24b. The drive gear 35b rotates in a bearing 35d (FIGS. 1, 7, 10) upstanding from the base 24b and is connected to the motor 35c by a shaft 35e. The rotary drive means 35 is connected to one means of the wrapping means 32 and the pipe 12 for causing relative rotary movement therebetween and thus wrapping the tape 10 about the pipe 12. In the embodiment of FIG. 1, the rotary drive means 35 is connected to the rotatable shuttle 30 for the purpose of rotating such rotatable shuttle 30 and the wrapping means 32 in the direction of the arcuate arrow shown in FIGS. 1, 3A, 6, 7, 10.

Bonding agent supply means, such as a bonding agent supply tank 36 (FIGS. 1, 2, 6, 10) or the like, is disposed adjacent the housing 24 and the pipe 12 and is utilized for feeding the bonding agent 22 (through a hole 38, FIGS. 1, 6, 10, in the cylindrical portion 24a of the stationary housing 24) to the pipe 12 ahead of the last wrapped turn LWT of the tape 10 on the pipe 12.

Bonding agent wiping means 40 (FIGS. 1, 7, 9) are mounted on the rotatable shuttle 30 at 31 (FIGS. 1, 7, 10) and are utilized for picking up the deposited bonding agent 22 on the pipe 12, for transferring the bonding agent 22 on the pipe 12 around the pipe 12 adjacent the last wrapped turn LWT of the tape 10 on the pipe 12 preparatory for the application of the next wrapped turn of the tape 10 by the wrapping means 32, for transferring the bonding agent 22 on the pipe 12 onto the underlapping margin 16 preparatory for the wrapping of the overlapping margin 18 of the next wrapped turn of the tape 10 thereon, and for substantially filling the transitional cavity 20 with the bonding agent 22.

BONDING AGENT WIPING MEANS 40

Figure 11:
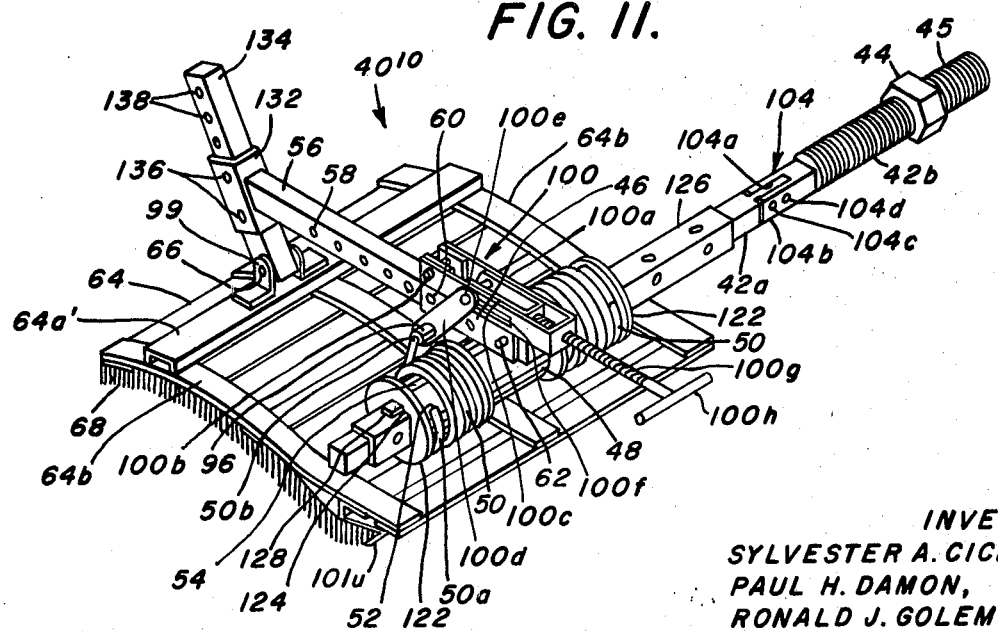
FIG. 11 is an enlarged perspective view of the bonding agent wiping means and the tensioning means and showing the tensioning means in the released or unloaded position.
Figure 14:
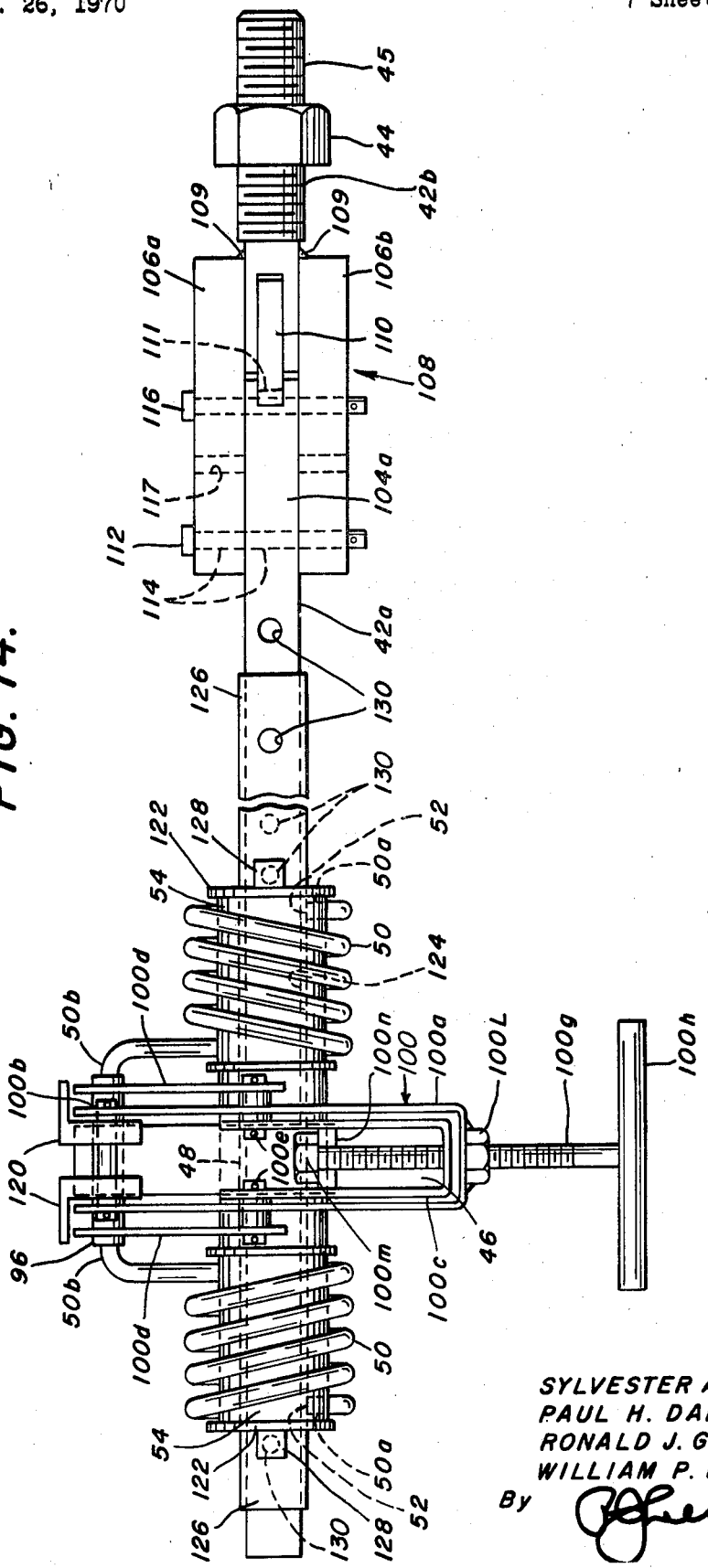
FIG. 14 is an enlarged side elevational view of the mounting member, the biasing means and the tensioning means and showing the tensioning means in the released or unloaded position.

As shown particularly in FIGS. 1, 7, 9, the bonding, agent wiping means 40 has a mounting rod 42 (FIGS. 1, 7, 9, 10, 11) projecting from the shuttle 30 at 31 and secured thereto as by means of nuts 44 (FIGS. 1, 7, 9, 11, 14) on the threaded end 45 (FIGS. 1, 7, 9, 10, 11, 14) of the mounting rod 42. For the purpose of permitting pivotable movement of the bonding agent wiping means 40 on the mounting rod 42, a horizontal positioning sleeve 46 (FIGS. 1, 7, 9, 10, 11, 14) is secured to a rotatable sleeve 48 (FIGS. 1, 7, 9, 10, 11, 14) as by welding or the like, which rotatable sleeve 48 is rotatable on the central portion of the mounting rod 42 (FIGS. 1, 7, 9, 10). The means utilized to bias the horizontal positioning sleeve 46 in a downward direction toward the pipe 12 are a pair of tensioning springs 50 (FIGS. 1, 7, 9, 10, 11, 14), each tensioning spring 50 having an outer free end 50a (FIGS. 9, 11, 14) secured in a hole 52 (FIGS. 9, 11, 14) in a positioning sleeve 54 (FIGS. 9, 11, 14). The inner free end 50b (FIGS. 9, 10, 11, 14) of each of the tensioning springs 50 is inserted into spring retainer 96 (FIGS. 9, 11, 14) which spring retainer 96 is secured, as by welding or the like, to the horizontal positioning sleeve 46. The tensioning springs 50 are a right-hand spring and a left-hand spring to provide tension or pressure in the same direction.

Figure 12:
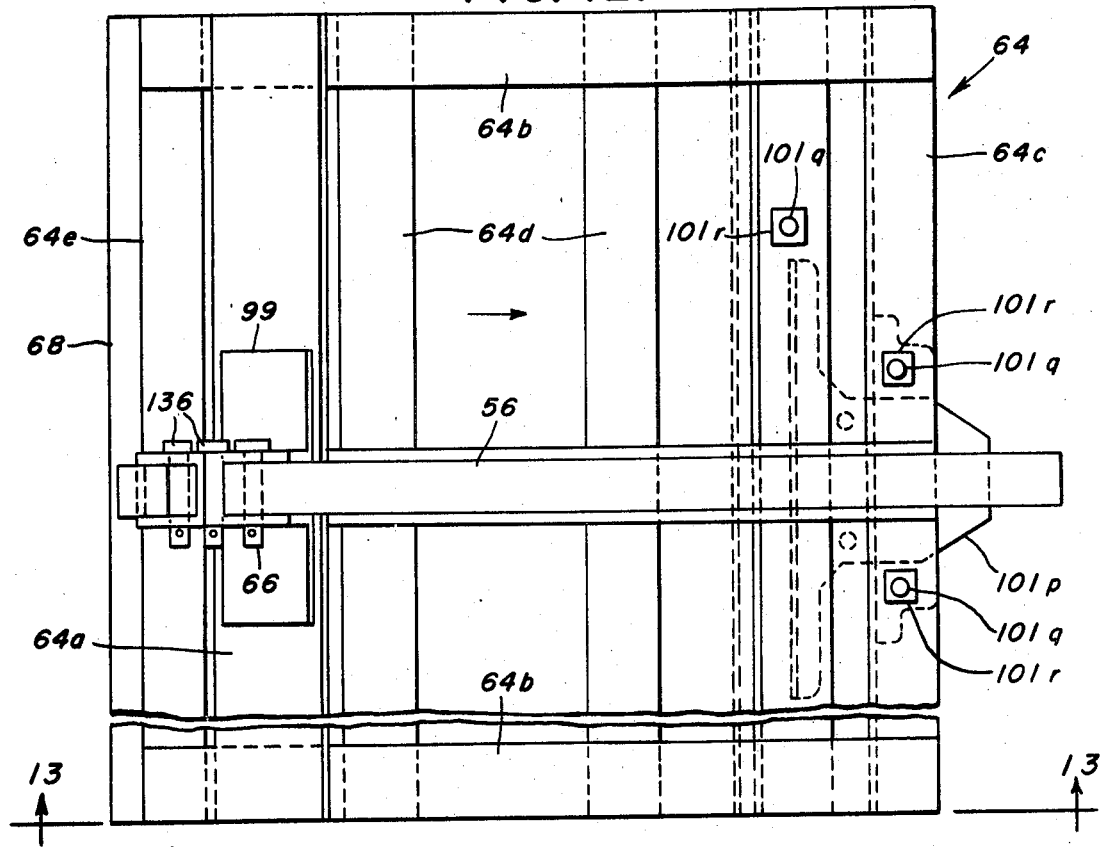
FIG. 12 is an enlarged plan view of the wiper member frame shown in FIGS. 10 and 11 and including the vertical positioning means and the horizontal positioning arm.
Figure 13:
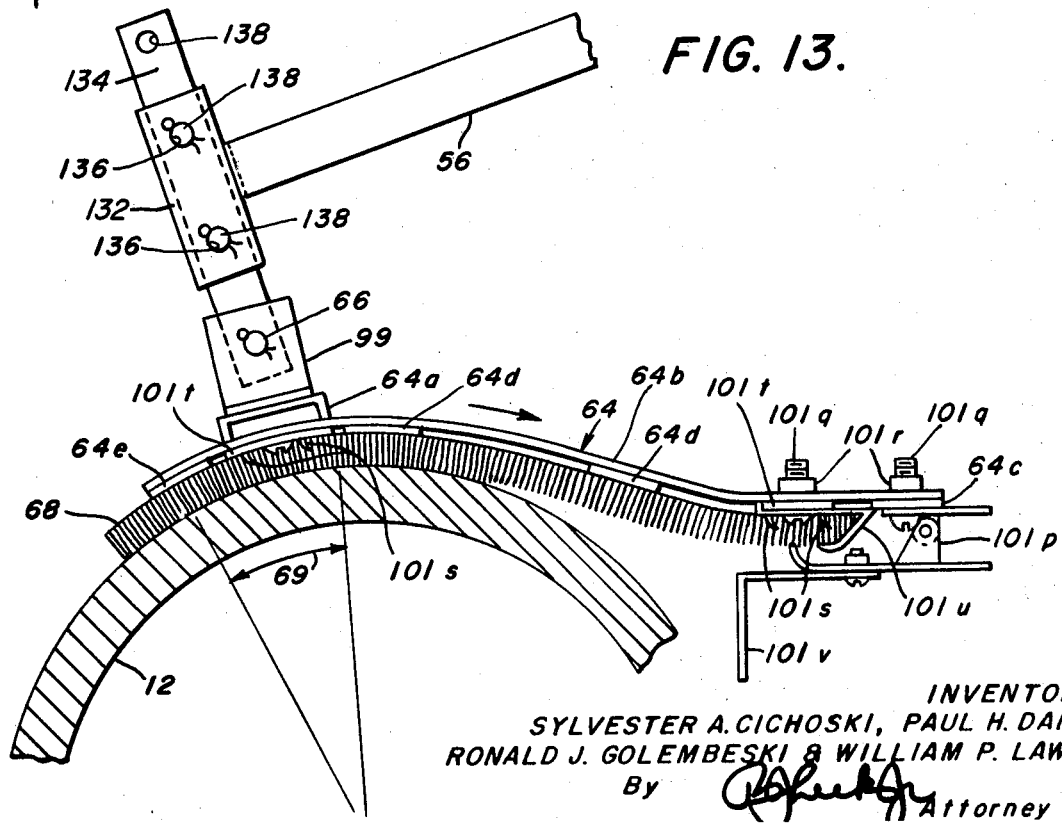
FIG. 13 is a view similar to a side elevational view taken along the line 13—13 of FIG. 12 in the direction of the arrows and showing also the wiper member affixed to the wiper member frame and in engagement with the longitudinal member or pipe along the contact surface of the wiper member.

A horizontal positioning arm 56 (FIGS. 1, 7, 9, 10, 11, 12, 13) is provided with a plurality of spaced holes 58 (FIGS. 1, 7, 9, 11). The spaced holes 58 are aligned with one of the plurality of holes 60 (FIGS. 1, 7, 9, 11) in the horizontal positioning sleeve 46 for the desired location of the free end of the horizontal positioning arm 56. Suitable means, such as a pin 62 (FIGS. 9, 11) extend through a spaced hole 58 in the horizontal positioning arm 56 and the aligned hole 60 in the horizontal positioning sleeve 46 to secure the horizontal positioning assembly in the desired position. The left-hand or outer end (as viewed in FIG. 1) of the horizontal positioning arm 56 has a wiper frame 64 (FIGS. 1, 2, 7, 9, 10, 11, 12, 13) pivotably connected at 66 (FIGS. 1, 7, 9, 11, 12, 13) to such free or left-hand end of the horizontal positioning arm 56. The wiper frame 64 carries a wiper member, such as a rug 68 (FIGS. 1, 2, 7, 9, 10, 11, 12, 13) or the like, which rug 68 is suitably clamped along the hook member 101u (FIGS. 9, 11, 13) of the wiper frame 64 to such wiper frame 64 as by a clamp 101p (FIGS. 12, 13) or the like. The rug 68 contacts the pipe 12 and underlapping margin 16 along its contact surface 69 (FIG. 13).

The fabric type rug 68 may be, for example, a dense weave nylon, tufted carpeting or the like having a pile height of about twice the height of a bead (not shown) between welded pipe 12. Bonding agent 22 on the pipe 12 is absorbed by the rug 68, is wiped around the pipe 12, migrates or transfers laterally over the untaped portion of the pipe 12 adjacent the last wrapped turn LWT and over the underlapping margin 16 and deposits thereon. It will be noted from FIG. 2A that the width Wc of the coated primer 22 applied to the uncoated portion of the pipe 12 and on the last wrapped turn LWT is greater than the width Wt of the tape 10 thereby providing an inspection edge 65 (FIG. 2A) on the applied bonding agent 22 for quality control purposes.

ALTERNATIVE EMBODIMENTS

It will be understood by those skilled in the art that alternatively the above described apparatus may be modified as shown in FIGS. 3A–8.

Figure 3A:
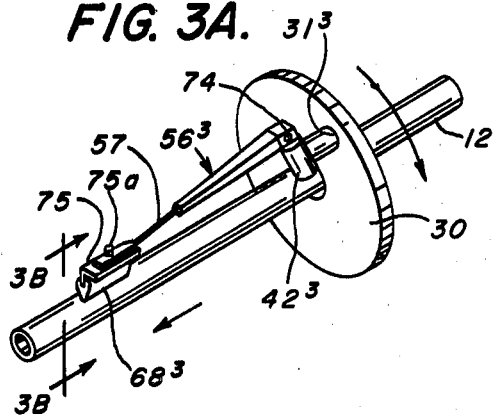
FIG. 3A is a perspective view of an alternative embodiment of the bonding agent wiping means showing a blade-tape wiper member mounted on a wiper blade assembly which assembly is pivoted on the shuttle member.
Figure 3B:
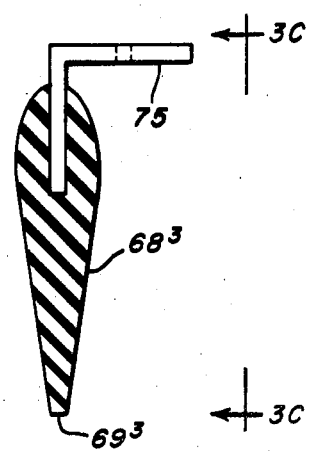
FIG. 3B is an end view taken along the line 3B—3B of FIG. 3A in the direction of the arrows and showing the blade-type wiper member and its mounting plate affixed thereto.
Figure 3C:
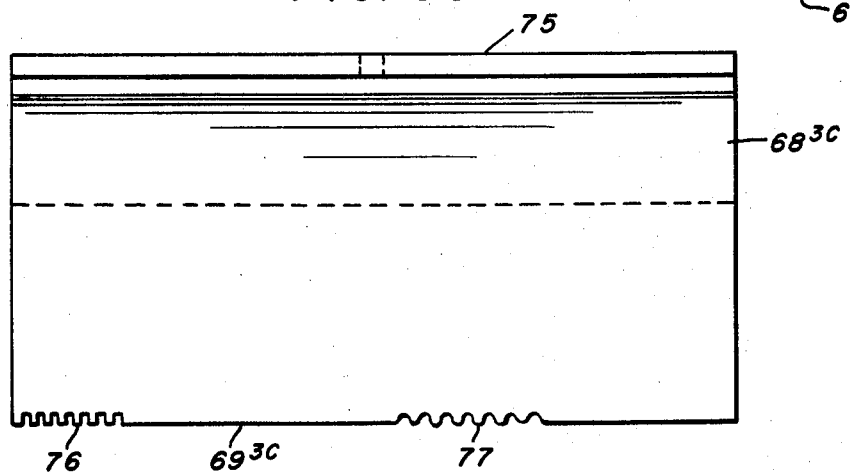
FIG. 3C is a view similar to one taken along the line 3C—3C of FIG. 3B in the direction of the arrows and showing a side elevational view of an alternative embodiment of the blade-type wiper member having either serrations or corrugations on its contact wiping surface.
Figure 4:
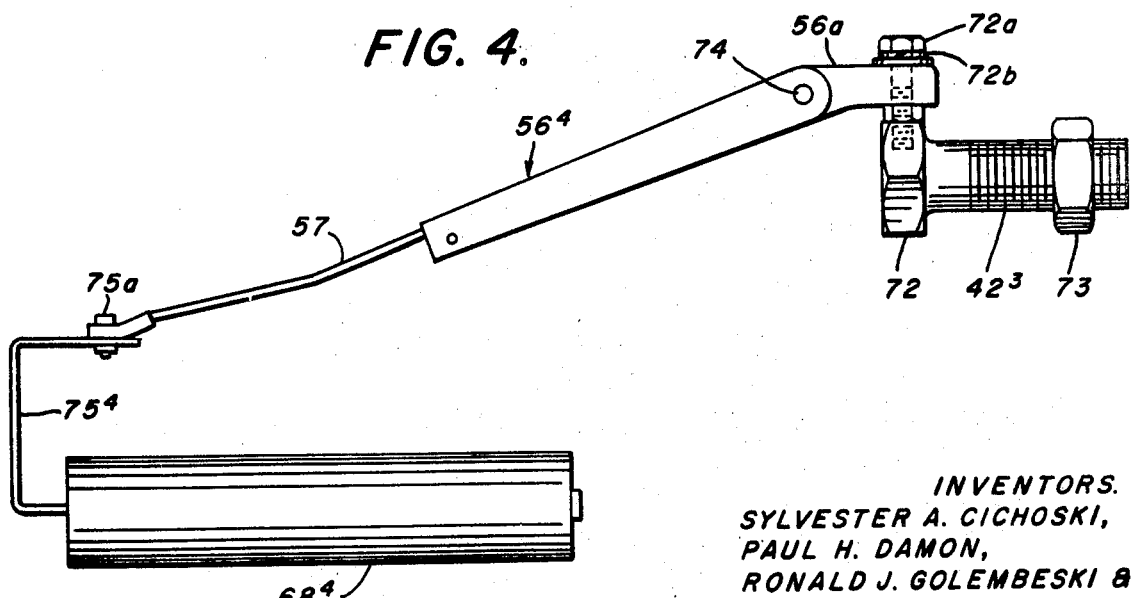
FIG. 4 is a fragmentary side elevational view of another alternative embodiment of the wiper member and showing a roller type member mounted on the wiper blade assembly.

In FIGS. 3A, 4, a mounting bracket $42^3$ is secured at $31^3$ (FIG. 3A) on the shuttle 30. The mounting bracket $42^3$ (shown in enlarged detail in FIG. 4) comprises a threaded shaft 72 (FIG. 4) secured at $31^3$ (FIG. 3A) on the rotatable shuttle 30 by a nut 73 (FIG. 4). For the purpose of mounting a windshield wiper type blade mounting assembly $56^3$ (FIG. 3A) on the nut 73, the upper end 56a (FIG. 4) of the assembly $56^3$ is fixably secured by a bolt 72a (FIG. 4) and a lock washer 72b (FIG. 4) to the threaded shaft 72. The bolt 72a extends through the upper end 56a of the blade assembly $56^3$ and into a threaded portion of the head of the threaded shaft 72. As shown in FIGS. 3A and 4, a blade arm 57 of the blade assembly $56^3$ is pivoted at 74 (FIGS. 3A, 4) in an up and down direction on the fixed upper portion 56a of the blade assembly $56^3$. The lower portion of the blade assembly $56^3$ (as viewed in FIG. 3A) is connected by means of a bolt, screw, or the like 75a (FIGS. 3A, 4) to a mounting plate 75 (FIGS. 3A, 3C) which mounting plate 75 carries a wiper member $68^3$ (FIGS. 3A, 3B) having a contact surface $69^3$ (FIG. 3B). As shown in FIG. 3B, the wiper member $68^3$ may be formed of rubber or the like.

In FIG. 3C, the contact surface $69^{3C}$ of the wiper member $68^{3C}$ may be formed with serrations 76, corrugations 77, or the like.

In FIG. 4, the wiper member is shown in the form of a paint type roller $68^4$ rotatable in a mounting plate $75^4$, which mounting plate $75^4$ is secured at 75a to the lower end of the blade arm 57.

The roller type wiper member $68^5$ (FIG. 5) is rotatable in end bearings 78 mounted on the mounting plate $75^5$. In addition, a square cross sectioned wire or strip 79 provided with a chamfer slot 80 is wound in side-to-side-turn relationship about the periphery of the roller $68^5$ to provide an irregular surface thereon similar to the serrations 76 and the corrugations 77 shown in FIG. 3C. Alternatively, the wire or the strip 79 may be replaced by either rounded wire (not shown), or grooves (not shown) machined into the member $68^5$, or the like.

Referring now to FIG. 6, the bonding agent supply means $36^6$ has a pressurized tank 36 which receives bonding agent from a bonding agent supply indicated by the legend "From bonding agent supply" in FIG. 6. The tank 36 feeds the pressurized bonding agent 22 through a spray nozzle 81 and through the hole 38 in the cylindrical portion 24a of the housing 24 onto the untaped surface of the pipe 12.

A centrifugal-type bonding agent supply means $36^7$ is shown in FIG. 7. In this embodiment the rotatable shuttle $30^7$ rotates in a substantially hermetic sealing engagement within a stationary circular tank 82 on the cylindrical portion 24a of the housing 24, and the tank 82 is connected by means of a pipe 83 to the bonding agent supply. The bonding agent 22 is centrifugally exuded from an outlet 84 in the rotatable shuttle $30^7$ onto the untaped portions of pipe 12.

In FIG. 8, a longitudinal drive means 29 comprises a carriage 85 mounted on wheels 86. The wheels 86 ride on tracks 87 and are powered by means of a shaft 88 driven through gears 89 by a motor 90. The pipe 12 is supported on the carriage 85. The rotary drive means $35^8$ comprises a drive roller 91 on a shaft 92 powered by a motor 93. The motor 93 is mounted on, and the shaft 92 is journaled in, a bracket 94 upstanding from the carriage 85. A driven roller 95, similarly mounted on a shaft 92 and bracket 94, engages the other side of the pipe 12 to provide the desired rotary motion to the pipe 12.

Referring to FIG. 9 which is an enlargement of the bonding agent wiping means 40 shown in FIGS. 1, 7, such bonding agent wiping means 40 has a mounting member, such as the threaded mounting rod 42. The right-hand threaded end 45 of the mounting rod 42 carries a nut 44 which secures or locks the mounting rod 42 to the rotatable shuttle 30 (not shown in FIG. 9). The tensioning springs 50 (FIG. 9) are disposed about the positioning sleeves 54 on the mounting rod 42 and have their outer free ends 50a secured in a suitable hole 52 in the positioning sleeves 54. The inner free end 50b (FIG. 9) of each tensioning spring 50 is inserted into a spring retainer 96 (suitably a pipe or the like). The spring retainer 96 is secured to the underside of the horizontal positioning sleeve 46, as by welds 97 or the like.

The wiper frame 64 (FIG. 9) is pivotably secured at 66 by a pin extending through brackets 99 (FIGS. 9, 11, 12, 13), upstanding from a back mounting plate 64a of the wiper frame 64) and through the outer end of the horizontal positioning arm 56. The wiper frame 64 has longitudinal members 64b (FIGS. 9, 12, 13), which longitudinal members 64b are integrated, as by welding or the like, to a front member 64c (FIGS. 9, 12, 13), cross members 64D (FIGS. 9, 12, 13), and a back member 64e (FIGS. 9, 12, 13). The above described positioning sleeves 54 (FIG. 9) are secured or positioned on the mounting rod 42 against the rotatable sleeve 48 by a pair of lock nuts 44a, 44b (FIG. 9) rotatable on the threaded mounting rod 42 on the outer sides of each of the tensioning springs 50. Each positioning sleeve 54 (FIG. 9) is secured, as by welding or the like, to a lock nut 44a. In order to control the tension in tensioning springs 50, the lock nuts 44a are rotated on the threaded rod 42 until the desired tension is achieved and are then locked in position by lock nuts 44b. The nuts 44a are also used to position the bonding agent wiping means 40 the desired distance D (FIG. 1) from the rotatable shuttle 30 to accommodate varying helix angles of application of the tape 10 and varying widths of the tape 10.

TENSIONING MEANS 100

The further alternative embodiment of the apparatus $14^{10}$ (FIG. 10) shown in detail in FIGS. 10–14 utilizes a tensioning means 100 (FIGS. 10, 11, 14) connected to the tensioning springs 50 for controlling the biasing of the bonding agent wiping means $40^{10}$ (FIGS. 10, 11) against the pipe 12. The tensioning means 100 has, for example and not by way of limitation, a first yoke member 100a (FIGS. 11, 14) pivoted at pin 100b (FIGS. 11, 14) on the horizontal positioning sleeve 46. A second yoke member 100c (FIGS. 11, 14) is reciprocable with respect to the first yoke member 100a. The link members 100D (FIGS. 10, 11, 14) are pivotably connected to the inner free ends 50b of the tensioning springs 50 at one end and are pivotably connected at the other end by a pin 100e (FIGS. 11, 14) extending through the other end of the link members 100d, a slot 100f (FIG. 11) in the first yoke member 100a and the second yoke member 100c. The first yoke member 100a and the second yoke member 100c are rotatable on the pin 100b from a release or unloaded position (shown in FIGS. 11 and 14) to a tensioning or loaded position (shown in FIG. 10) to bias or pressure the wiper member 68 against the pipe 12.

YOKE POSITIONING MEANS

Yoke positioning means (FIGS. 11, 14) are connected to the first yoke member 100a and the second yoke member 100c for varying the biasing on the tensioning springs 50. As shown particularly in FIGS. 11, 14, a handle 100h is threaded by means of threaded rod 100g (FIGS. 11, 14) in a fixed nut 100L (FIG. 14) mounted, as by welding or the like, on the first yoke member 100a. The threaded rod 100g extends through a suitable hole in the first yoke member 100a, the second yoke member 100c, and a bridge member 100n (FIG. 14) extending across the second yoke member 100c. The threaded rod 100g carries a stop 100m (FIG. 14) on its outer end. The stop 100m, as shown in FIG. 14, is a nut secured, as by welding or the like, to the end of the handle 100h and bears against the bridge member 100n of the second yoke member 100b.

OPERATION OF TENSIONING MEANS 100

In order to increase the tension on the tensioning springs 50 while the threaded handle 100h is in the tensioning position (FIG. 10), the threaded handle 100h is threaded in the direction of the arrow shown in FIG. 10 to move the second yoke member 100c (FIG. 14), the link members 100d (FIGS. 10, 14) and the inner free ends 50b (FIGS. 10, 14) of the tensioning springs 50 in the same direction as the above described movement of the threaded handle 100h thereby increasing the tension of the tensioning springs 50.

Pivotable movement of the threaded handle 100h about its pivot pin 100b from the released or unloaded position shown in FIGS. 11 and 14 to the loaded or tensioning position shown in FIG. 10 then biases the wiper frame 64 and the wiper member 68 against the pipe 12 with the desired amount of tension thereon.

Alternatively, the threads 100g (FIGS. 11, 14) of the threaded handle 100h can thread into the first yoke member 100a (FIGS. 11, 14) and the nut 100L (FIG. 14) can be eliminated.

YOKE STOP ASSEMBLY

In order to prevent release of the tension on the bonding agent wiping means $40^{10}$ when the threaded handle 100h is in the loaded position shown in FIG. 10, stops 120 (FIG. 14) are mounted on the pin 100b so that when the threaded handle 100h is moved to the loaded position shown in FIG. 10 (forwardly off center), the first yoke member 100a contacts the stops 120 to prevent release of the tension in the forward direction. When the first yoke member 100a is in contact with the stops 120 and the threaded handle 100h is in the (forwardly off center) loaded position shown in FIG. 10, the bias, tension or pressure exerted by the bonding agent wiping means $40^{10}$ on the pipe 12 may be quickly released by striking the threaded handle 100h to cause it to rotate in clockwise direction, as viewed in FIG. 10, to the position shown in FIG. 11.

SLIDE-ON MOUNTING ASSEMBLY

The positioning nuts 44a, 44b (FIG. 9) may be replaced by the slide-on type mounting shown in FIGS. 11, 14. In this case, an end plate 122 (FIGS. 11, 14) is secured, as by welding or the like, to the positioning sleeves 54. The positioning sleeves 54 and end plates 122 are provided with a non-round mounting hole 124 (FIGS. 11, 14) which receives a mating mounting sleeve 126 (FIGS. 11, 14), which mounting sleeve 126 is slidably mounted on non-round mounting rod 42a. In order to position the bonding agent wiping means $40^{10}$ in the desired location on the mounting rod 42a (FIGS. 11, 14) headed pins 128 (FIGS. 11, 14) extend through a selected pair of registering holes 130 (FIG. 14) extending through the mounting sleeve 126 and the mounting rod 42a. It will be understood that there are a plurality of such spaced registering holes 130 in the mounting sleeve 126 and in the mounting rod 42a.

THREE DIMENSIONAL POSITIONING DEVICE

It will be understood that the nuts 44a, 44b (FIG. 9) and the slide-on-type mounting described above and shown in FIG. 11 form the embodiments of a Z-plane positioning means of a three dimensional positioning device.

In order to accommodate varying sizes of the pipe 12, a horizontal or X-plane positioning means of the three dimensional positioning device and a vertical or Y-plane positioning means of the three dimensional positioning device are provided on the bonding agent wiping means $40^{10}$.

HORIZONTAL POSITIONING MEANS

The horizontal positioning means shown in FIGS. 1, 7, 9, 11 is shown particularly in detail in FIG. 11. The horizontal positioning arm 56 is positionable with respect to the horizontal positioning sleeve 46 by insertion of a pin 62 in one registering pair of holes 58 (in the horizontal positioning arm 56) and holes 60 (in the horizontal positioning sleeve 46). There are a plurality of such spaced registerable holes 58, 60.

VERTICAL POSITIONING MEANS

The vertical positioning means (FIGS. 10, 11, 13) and shown particularly in FIG. 11, has a vertical positioning sleeve 132 secured angularly (as by welding or the like) to the outer end of the horizontal positioning arm 56 to receive a vertical positioning arm 134, which vertical positioning arm 134 is pivotably connected at 66 to bracket 99 upstanding from the back mounting plate 64a' (FIG. 11). A pin or pins 136 (FIGS. 11, 13) extend through selected registering holes 138 (FIGS. 11, 13) in both the vertical positioning sleeve 132 and the vertical positioning arm 134 to position the wiper frame 64 against the pipe 12.

COUPLING ASSEMBLY FOR LOCKING AND REPOSITIONING THE ASSEMBLY 40

Referring to FIG. 11 a coupling assembly 104 for locking the assembly 40$^{10}$ in the position shown in FIGS. 11, 14 and for permitting the repositioning of such assembly 40$^{10}$ in an elevated or rest position (not shown) away from the pipe 12 as hereinafter described below is employed. In this assembly 104, the rod 42a has a male portion 104a (FIGS. 11, 14) inserted in a female portion 104b (FIG. 11) of the threaded rod 42b. The male portion 104a is secured to the female portion 104b by pins 104c or the like extending through registering holes 104d in the male portion 104a and in the female portion 104b.

Alternatively, in FIG. 14 the male portion 104a of the rod 42a is inserted between side pieces 106a, 106b of a yoke 108 and are secured, as by welding or the like, at 109 to the threaded rod 42b. For the purpose of limiting the pivotable movement of the rod 42a with respect to the threaded rod 42b, a stop 110 having a downwardly front taper 111 is secured to the threaded rod 42b. When it is necessary to pivot the rod 42a and the bonding agent wiping means 40$^{10}$ (not shown in FIG. 14) with respect to the threaded rod 42b, a retaining pin 112 is removed from registering holes 114 in the side pieces 106a, 106b and the male portion 104a, and the rod 42a and assembly 40$^{10}$ are pivoted on a pivot pin 116 until the male portion 104a engages the taper 111. The retaining pin 112 (FIG. 14) is then inserted in registering holes 117 in the side pieces 106a, 106b.

WIPER MEMBER 68

For the purpose of securing the wiper member 68 (a rug as shown in FIGS. 10-13) on the wiper frame 64, clamp means, such as the spring clamp 101p or the like, (FIGS. 12, 13) is mounted by means of bolts 101q (FIGS. 12, 13) and nuts 101r (FIGS. 12, 13) or the like (FIGS. 12, 13) on the front member 64c of the wiper frame 64 and secures the rug 68 to the wiper frame 64. Since the wiper frame 64 moves in the direction of rotary movement indicated by the arrows in FIGS. 12 and 13, it is not essential that the rearward portions of the rug 68 be otherwise secured to the wiper frame 64. However, alternatively or in addition to the spring clamp 101p, barb means, such as the barbs 101s or the like (FIG. 13), may project from a plate 101t (FIG. 13) mounted on the forward cross member 64d, as viewed in FIGS. 12 and 13, as by, for example, the bolts 101q and nuts 101r or the like. As shown in FIG. 13, the barbs 101s and the plate 101t may be similarly mounted on the rearward portions of the wiper frame 64 as, for example, adjacent the back mounting plate 64a (FIG. 13). The wiper positioning means utilized to position the front edge of the rug 68 on the wiper frame 64 may comprise the hook-like edging bar member 101u projecting from the forward portions of the plate 101t.

In order to deflect the bonding agent 22 (which is moved away from the pipe 12 due to centrifugal action due to either rotation of the pipe 12 or the rotatable shuttle 30) backwardly toward the pipe 12 during rotation of either the pipe 12 or rotatable shuttle 30, bonding agent guard means, such as the guard plate 101v, or the like (FIG. 13), may be mounted on the wiper frame 64 as, for example, adjacent the rearward portions of the front cross member 64d, as by welding or the like.

It will be understood that the longitudinal member referred to above may be a pole, post, piling, cable, conduit bars or the like, hollow or solid, and not necessarily round in shape.

METHOD

It will be recognized by those skilled in the art from the above description of the improved apparatuses 14 (FIGS. 1-9) and 14$^{10}$ (FIGS. 10-14) that an improved method is contemplated by this invention, which method may be performed by the above described forms of the apparatuses 14, 14$^{10}$, or by hand.

The novel method for the wiping transfer of the bonding agent 22 onto the pipe 12 and onto the underlapping margin 16 (FIG. 2A) of the protective tape 10 being wrapped in spiral lapping engagement on the longitudinal member or pipe 12 has during the wrapping operation an underlapping margin 16 and an overlapping margin 18. The underlapping margin 16 (FIG. 2A) defines with the pipe 12 a transitional cavity 20. The tape 10 is wrapped on the pipe 12, as shown in FIGS. 1, 7, 10, with the bonding agent 22 therebetween. The overlapping margin 18 is wrapped on the underlapping margin 16 (FIG. 2A) with the bonding agent 22 therebetween and the transitional cavity 20 is substantially filled with the bonding agent 22 and covered by the overlapping margin 18. The tape 10 has a last wrapped turn LWT (FIGS. 1, 2, 7, 10) on the pipe 12 during the wrapping operation.

The novel method includes the steps of:

(a) causing relative longitudinal movement between the pipe 12 and the tape 10 along a path of wrapping movement (FIGS. 1, 7, 8, 10);

(b) connecting a free end of the tape 10 to the pipe 12;

(c) causing relative rotary movement between the pipe 12 and the tape 10 to wrap the tape 10 about the pipe 12 (FIGS. 1, 7, 8, 10);

(d) feeding the bonding agent 22 to the pipe 12 ahead of the last wrapped turn LWT of the tape 10 on the pipe 12 (FIGS. 1, 7, 10); and (e) picking up the bonding agent 22 on the pipe 12, transferring the bonding agent 22 on the pipe 12 around the pipe 12 adajcent the last wrapped turn LWT of the tape 10 on the pipe 12 preparatory for the application of the next wrapped turn of the tape 10, transferring the bonding agent 22 on the pipe 12 onto the underlapping margin 16 preparatory for the wrapping of the overlapping margin 18 of the next wrapped turn of the tape 10 thereon, and substantially filling the transitional cavity 20 with the bonding agent 22.

SUMMARY OF THE ACHIEVEMENTS OF THE OBJECTS OF THE INVENTION

It will be recognized by those skilled in the art that the objects of this invention have been achieved by providing novel apparatuses 14 (FIGS. 1-9), 14$^{10}$ (FIGS. 10-14) for the wiping transfer of the bonding agent 22 onto the pipe 12 and onto the underlapping margin 16 of the protective tape 10 in overlapping engagement on a longitudinal member, such as a pipe 12 or the like.

The novel apparatuses 14, (FIGS. 1-9), 14$^{10}$, (FIGS. 10-14):

(a) utilize direct contact between the bonding agent wiping means 40 (FIGS. 1-9) and 40$^{10}$ (FIGS. 10-14) with the pipe 12 where the bonding agent 22 is picked up on the pipe 12 adjacent the bonding agent tanks 36 (FIGS. 1, 2, 6, 10) and 36$^7$ (FIG. 7) and the contact surface 69 (FIG. 13), 69$^3$ (FIG. 3B), 69$^{3C}$ (FIG. 3C) to where it is transferred and redeposited;

(b) provide a bonding agent inspection edge 65 (FIG. 2A) and a bonded joint between overlapping margin 18 and underlapping margin 16 thereby providing a continuous wrapped tape envelope about the pipe 12;

(c) substantially fill the transitional cavity 20 with the bonding agent 22 and cover the transitional cavity 20 with the overlapping margin 18 of the tape 10;

(d) are universally adapted to use a wide range of bonding agent materials 22 including those with abnormally low or high viscosities;

(e) bond the underlapping margin 16 of the tape 10 and the overlapping margin 18 of the tape 10 with an internal source of bonding agent 22 deposited on the pipe 12 ahead of the last wrapped turn LWT of the tape 10 on the pipe 12; and (f) is adapted for use with any and all conventional types of tape wrapping machines and sizes of pipe 12.

While in accordance with the patent statutes, preferred and alternative embodiments of this invention have been illustrated and described in detail, it is to be particularly understood that this invention is not limited thereto or thereby.

We claim:

1. Apparatus for the wiping transfer of a bonding agent onto a longitudinal member and onto the underlying portions of a protective tape being wrapped onto said longitudinal member, said tape having during the wrapping operation an underlapping margin and an overlapping margin, said underlapping margin defining with said longitudinal member a transitional cavity, said tape being wrapped on said longitudinal member with a bonding agent therebetween, said overlapping margin being wrapped on said underlapping margin with said bonding agent therebetween and said transitional cavity being substantially filled with said bonding agent and covered by said over-lapping margin, said tape having a last wrapped turn on said longitudinal member during said wrapping operation, said apparatus having:

(a) a housing disposed about said longitudinal member;

(b) longitudinal drive means connected to one member of said longitudinal member and said housing for causing relative longitudinal movement between said longitudinal member and said housing along a path of wrapping movement;

(c) wrapping means adjacent said housing for storing said tape and for feeding said tape to said longitudinal member;

(d) rotary drive means connected to one means of said wrapping means and said longitudinal member for causing relative rotary movement therebetween and for wrapping said tape about said longitudinal member;

(e) bonding agent supply means adjacent said housing and said longitudinal member for feeding said bonding agent to said longitudinal member ahead of said last wrapped turn of said tape on said longitudinal member;

(f) bonding agent wiping means on said housing for picking up said bonding agent on said longitudinal member, for transferring said bonding agent on said longitudinal member around said longitudinal member adjacent said last wrapped turn of said tape on said longitudinal member preparatory for the application of the next wrapped turn of said tape, for transferring said bonding agent on said longitudinal member onto said underlapping margin preparatory for the wrapping of the overlapping margin of said next wrapped turn of said tape thereon, and for substantially filling said transitional cavity with said bonding agent; and (g) a shuttle rotatable on said housing; and (h) said bonding agent wiping means has a mounting member secured to one of said housing and said shuttle, a horizontal mounting means pivotable on one end thereof on said mounting member, a wiper member frame pivotable on the other end of said horizontal mounting means, and a wiper member carried by said wiper member frame.

2. The apparatus recited in claim 1 and having biasing means connected to said horizontal mounting means for biasing said wiper member frame and said wiper member into engagement with said longitudinal member.

3. The apparatus recited in claim 1 and wherein said horizontal mounting means is positionable with respect to said mounting member.

4. Apparatus for the wiping transfer of a bonding agent onto a longitudinal member and onto the underlying portions of a protective tape being wrapped onto said longitudinal member, said tape having during the wrapping operation an underlapping margin and an overlapping margin, said underlapping margin defining with said longitudinal member a transitional cavity, said tape being wrapped on said longitudinal member with a bonding agent therebetween, said overlapping margin being wrapped on said underlapping margin with said bonding agent therebetween and said transitional cavity being substantially filled with said bonding agent and covered by said overlapping margin, said tape having a last wrapped turn on said longitudinal member during said wrapping operation, said apparatus having:

(a) a housing disposed about said longitudinal member;

(b) longitudinal drive means connected to one member of said longitudinal member and said housing for causing relative longitudinal movement between said longitudinal member and said housing along a path of wrapping movement;

(c) wrapping means adjacent said housing for storing said tape and for feeding said tape to said longitudinal member;

(d) rotary drive means connected to one means of said wrapping means and said longitudinal member for causing relative rotary movement therebetween and for wrapping said tape about said longitudinal member;

(e) bonding agent supply means adjacent said housing and said longitudinal member for feeding said bonding agent to said longitudinal member ahead of said last wrapped turn of said tape on said longitudinal member;

(f) bonding agent wiping means on said housing for picking up said bonding agent on said longitudinal member, for transferring said bonding agent on said longitudinal member around said longitudinal member adjacent said last wrapped turn of said tape on said longitudinal member preparatory for the application of the next wrapped turn of said tape, for transferring said bonding agent on said longitudinal member onto said underlapping margin preparatory for the wrapping of the overlapping margin of said next wrapped turn of said tape thereon, and for substantially filling said transitional cavity with said bonding agent;

(g) a shuttle rotatable on said housing; and (h) said bonding agent wiping means has a mounting member secured to one of said housing and said shuttle, a horizontal mounting means pivotable on one end thereof on said mounting member, a vertical mounting means carried by the other end of said horizontal mounting means, a wiper member frame pivotable on said vertical mounting means, and a wiper member carried by said wiper member frame.

5. The apparatus recited in claim 4 wherein said horizontal mounting means is positionable with respect to said mounting member.

6. The apparatus recited in claim 4 wherein said vertical mounting means is positionable with respect to said horizontal mounting means.

7. The apparatus recited in claim 1 wherein said mounting member has a mounting portion for connection to said one and a disconnect portion connected to said mounting portion.

8. The apparatus recited in claim 4 wherein said mounting member has a mounting portion for connection to said one and a disconnect portion connected to said mounting portion.

9. For an apparatus for the wiping transfer of a bonding agent onto a longitudinal member and onto the underlying portions of a protective tape being wrapped onto said longitudinal member, said tape having during the wrapping operation an underlapping margin and an overlapping margin, said underlapping margin defining with said longitudinal member a transitional cavity, said tape being wrapped on said longitudinal member with a bonding agent therebetween, said overlapping margin being wrapped on said underlapping margin with said bonding agent therebetween and said transitional cavity being substantially filled with said bonding agent and covered by said overlapping margin, said tape having a last wrapped turn on said longitudinal member during said wrapping operation, said apparatus having a housing disposed about said longitudinal member, longitudinal drive means connected to one member of said longitudinal member and said housing for causing relative longitudinal movement between said longitudinal member and said housing along a path of wrapping movement, wrapping means adjacent said housing for storing said tape and for feeding said tape to said longitudinal member, and rotary drive means connected to one means of said wrapping means and said longitudinal member for causing relative rotary movement therebetween and for wrapping said tape about said longitudinal member, a bonding agent applicator device having:

(a) bonding agent supply means adjacent said housing and said longitudinal member for feeding said bonding agent to said longitudinal member ahead of said last wrapped turn of said tape on said longitudinal member;

(b) bonding agent wiping means adjacent said housing for picking up said bonding agent on said longitudinal member, for transferring said bonding agent on said longitudinal member around said longitudinal member adjacent said last wrapped turn of said tape on said longitudinal member preparatory for the application of the next wrapped turn of said tape, for transferring said bonding agent on said longitudinal member onto said underlapping margin preparatory for the wrapping of the overlapping margin of said next wrapped turn of said tape thereon, and for substantially filling said transitional cavity with said bonding agent;

(c) a shuttle rotatable on said housing; and (d) said bonding agent wiping means has a mounting member secured to one of said housing and said shuttle, a horizontal mounting means pivotable on one end thereof on said mounting member, a wiper member frame pivotable on the other end of said horizontal mounting means, and a wiper member carried by said wiper member frame.

10. The apparatus recited in claim 1 wherein said bonding agent supply means is of the gravity type.

11. The apparatus recited in claim 1 wherein said bonding agent supply means is of the spray type.

12. The apparatus recited in claim 1 wherein said bonding agent supply means is of the pressure type.

13. The apparatus recited in claim 1 wherein said bonding agent supply means is of the centrifugal type.

14. The apparatus recited in claim 1 wherein said longitudinal drive means is connected to said housing.

15. The apparatus recited in claim 1 wherein said longitudinal drive means is connected to said longitudinal member.

16. The apparatus recited in claim 1 wherein said rotary drive means is connected to said shuttle member.

17. The apparatus recited in claim 1 wherein said rotary drive means is connected to said longitudinal member.

18. The apparatus recited in claim 1 wherein said bonding agent wiping means has biasing means connected to said horizontal mounting member for biasing said wiper member into engagement with said longitudinal member.

19. The apparatus recited in claim 1 wherein said horizontal mounting member is positionable with respect to said housing.

20. The apparatus recited in claim 1 wherein said wiper member is of the blade type for spreading said bonding agent around said longitudinal member adjacent said last wrapped turn of said tape on said longitudinal member and onto said underlapping margin.

21. The apparatus recited in claim 20 wherein said wiper member has one surface of a corrugated surface and a serrated surface for raking said bonding agent around said longitudinal member adjacent said last wrapped turn of said tape on said longitudinal member and onto said underlapping margin.

22. The apparatus recited in claim 1 wherein said wiper member is of the roller type.

23. The apparatus recited in claim 22 wherein said roller type wiper member has a grooved peripheral surface.

24. The apparatus recited in claim 23 wherein a grooved strip is wound around said peripheral surface to provide said grooved peripheral surface.

25. The apparatus recited in claim 18 and having tensioning means connected to said biasing means for controlling the biasing of said bonding agent wiper means against said longitudinal member.

26. The apparatus recited in claim 25 wherein said biasing means is secured at one end to said mounting member, a first yoke member is pivotable on said horizontal mounting means, and a link member connects the other end of said biasing means to said first yoke member, said first yoke member being rotatable from a release position to a tension position to bias said wiper member against said longitudinal member.

27. The apparatus recited in claim 25 wherein said biasing means is secured at one end to said mounting member, a first yoke member is pivotable on said horizontal mounting means, a second yoke member is reciprocable with respect to said first yoke member, and a link member connects the other end of said biasing means to said second yoke member, said first yoke member and said second yoke member being rotatable from a release position to a tension position to bias said wiper member against said longitudinal member.

28. The apparatus recited in claim 27 and having yoke positioning means connected to said first yoke member and said second yoke member for varying the biasing on said biasing means.

29. The apparatus recited in claim 1 wherein said bonding agent wiping means has clamp means at one end of said wiper member frame for securing said wiper membe rto said wiper member frame.

30. The apparatus recited in claim 1 wherein said bonding agent wiping means has barb means at one end of said wiper member frame for securing said wiper member to said wiper member frame.

31. The apparatus recited in claim 29 and having wiper positioning means on said one end of said wiper member frame for positioning the edge of said wiper member on said wiper member frame.

32. The apparatus recited in claim 31 and having wiper positioning means on said one end of said wiper member frame for positioning said wiper member on said wiper member frame.

33. The apparatus recited in claim 1 and having bonding agent guard means on said bonding agent wiping means for deflecting said bonding agent toward said longitudinal member.

34. The apparatus recited in claim 1 and having Z-plane positioning means connected to said bonding agent wiping means.

35. The apparatus recited in claim 1 and having Y-plane positioning means connected to said bonding agent wiping means.

36. The apparatus recited in claim 1 and having X-plane positioning means connected to said bonding agent wiping means.

References Cited
UNITED STATES PATENTS

| | | | |
|---|---|---|---|
| 1,319,455 | 10/1919 | Barlett | 93—94 |
| 1,985,979 | 1/1935 | Keeran | 126—39 |
| 2,371,224 | 3/1945 | Cumfer | 242—11 |
| 2,716,315 | 8/1955 | Jacoby | 54—98 |
| 2,877,150 | 3/1959 | Wilson | 39—80 |
| 3,018,212 | 1/1962 | Chinn | 156—195 |
| 3,170,489 | 2/1965 | Cunningham | 138—144 |
| 3,230,123 | 1/1966 | Christensen | 156—195 |
| 3,402,742 | 9/1968 | O'Brien | 138—143 |
| 3,404,050 | 10/1968 | Gill | 156—53 |
| 3,420,722 | 1/1969 | McNulty et al. | 156—195 X |
| 2,863,204 | 12/1958 | Timothy et al. | 156—392 X |
| 3,525,656 | 8/1970 | Kennedy | 156—392 X |
| 1,013,291 | 1/1912 | Gilmore | 156—187 |

CARL D. QUARFORTH, Primary Examiner

G. G. SOLYST, Assistant Examiner

U.S. Cl. X.R.

156—187, 195, 429, 430